United States Patent
Beehler et al.

[15] 3,700,165
[45] Oct. 24, 1972

[54] THUMBWHEEL VACUUM THERMOSTAT

[72] Inventors: Larry A. Beehler; Jackson R. Templin, both of Anderson, Ind.

[73] Assignee: General Motors Corporation, Detroit, Mich.

[22] Filed: Jan. 11, 1971

[21] Appl. No.: 105,185

[52] U.S. Cl. ...................... 236/13, 236/87, 236/101
[51] Int. Cl. ............................................ G05d 23/185
[58] Field of Search ............. 237/2; 236/87, 13, 101; 337/335, 370, 371

[56] References Cited

UNITED STATES PATENTS

| | | |
|---|---|---|
| 1,782,045 | 11/1930 | Mason ........................... 236/1 |
| 2,118,647 | 5/1938 | Hottenroth ................ 236/68 B |
| 2,312,671 | 3/1943 | Otto .......................... 236/87 X |
| 2,868,459 | 1/1959 | Modes ........................... 236/87 |
| 3,455,505 | 7/1969 | Beatenbough ............... 236/87 |
| 3,595,475 | 7/1971 | Morton ......................... 236/93 |

*Primary Examiner*—Edward J. Michael
*Attorney*—W. S. Pettigrew, J. C. Evans and K. H. MacLean, Jr.

[57] ABSTRACT

An automotive air temperature control system including a vacuum regulator which is responsive to the air temperature of the passenger compartment to vary the strength of vacuum applied to a multiposition vacuum motor which is connected to an air damper. The vacuum regulator includes a bleed port with a valve controlled by the combination of a main bimetal element and a compensator bimetal element whose relative response to changes in air temperature is in opposition to one another. The action of the compensator tends to reduce temperature overshoot caused by thermal delay of single bimetal regulators. Cam means connected to a thumbwheel dial are provided for manually setting the vacuum regulator for a range of predetermined temperatures.

2 Claims, 10 Drawing Figures

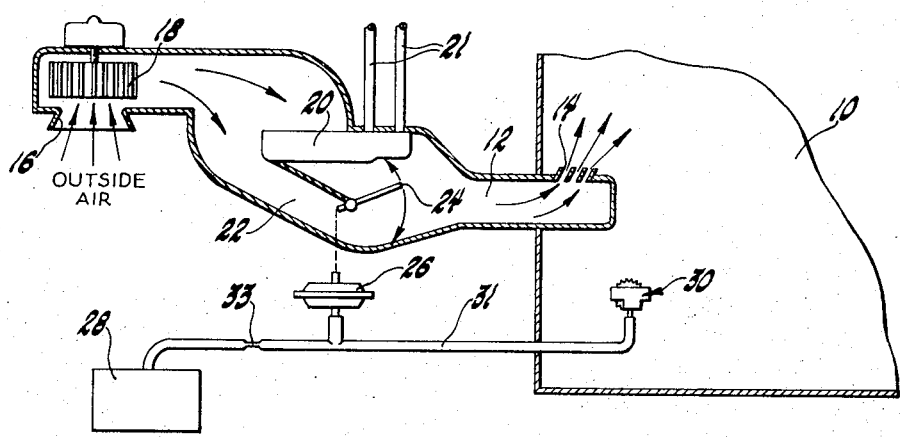
Fig.1
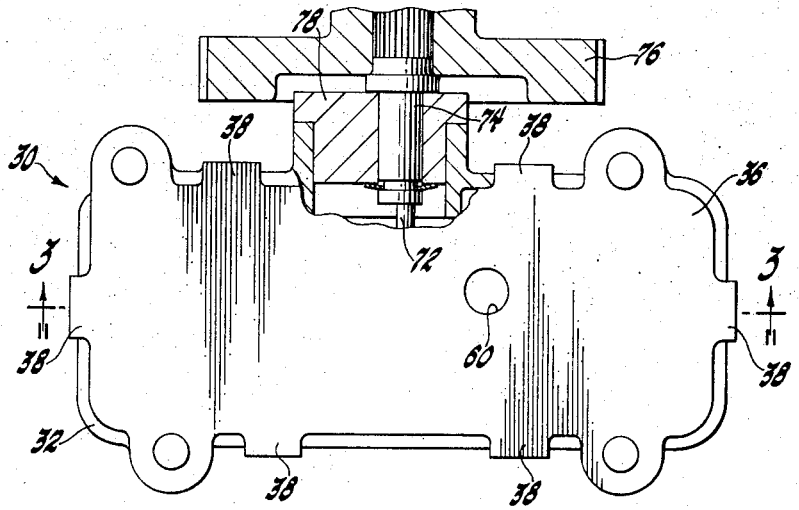
Fig.2
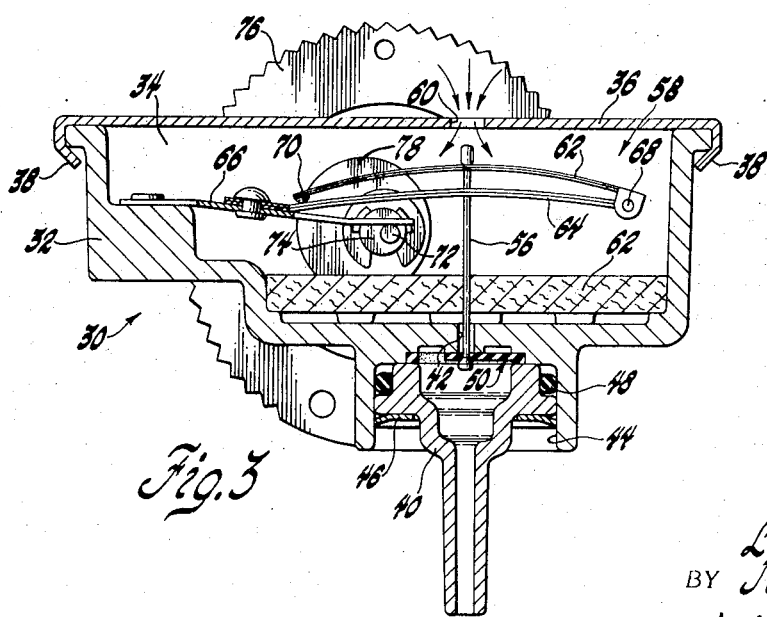
Fig.3
Fig.3a
INVENTORS
Larry A. Beehler &
BY Jackson R. Templin
K. H. MacLean, Jr.
ATTORNEY INVENTORS
Larry A. Beehler &
BY Jackson R. Templin K. H. MacLean, Jr.
ATTORNEY

THUMBWHEEL VACUUM THERMOSTAT

This invention relates to automotive air temperature control systems and vacuum regulators responsive to changes in air temperature.

The subject control system is a low cost automatic air temperature control system for regulating the temperature of an automobile passenger compartment. The system uses a multiposition vacuum motor to pivot an air damper for regulating the temperature of air by mixing various proportions of warm and cool air. A vacuum regulator senses the temperature of air in the passenger compartment to vary the strength of raw vacuum supplied to the vacuum motor. The system can be used in automobiles equipped with only a heater or with a heater-air-conditioning combination.

More particularly, the vacuum regulator of the present invention utilizes dual bimetal elements to sense the air temperature in the passenger compartment. These bimetal elements respond to the air temperature to position a bleed valve element with respect to an air bleed port. The action of the valve controls the admission into the vacuum line of air at atmospheric pressure and thus varies the strength of raw vacuum from the intake manifold of the internal combustion engine.

A problem with regulators using a single bimetal temperature sensing element is temperature overshoot. This is caused by the lack of prompt thermal reaction of the bimetal to temperature changes. For example, if the vacuum regulator is initially set for a relatively low temperature with respect to ambient temperature when the system is activated, a single bimetal element will initially tend to position the valve element so as to admit air into the passenger compartment at a minimum temperature. The passenger compartment rapidly cools more than the preset temperature and the delay of the bimetal to sense the temperature causes repositioning at a setting to cause warmer air than the preset temperature to flow into the passenger compartment. Because of this delay, several oscillations may occur before a single bimetal sensor will deliver air at the correct setting. Obviously, this temperature oscillation or hunting is undesirable and delays proper conditioning of the passenger compartment.

The subject vacuum regulator utilizes a main or first bimetal element linked to the air bleed valve for sensing the air temperature of the passenger compartment. A second or compensator bimetal element also affects the position of the air bleed valve. The first bimetal element and the compensator bimetal element are arranged to respond oppositely to changes in the air temperature of the passenger compartment. The compensator bimetal is adapted and designed to more slowly respond to temperature changes than the main bimetal. This opposing and delayed response of the compensator bimetal tends to reduce or eliminate temperature overshoot. In operation, the first bimetal element rapidly responds to an air temperature change to position the air bleed valve for maximum heating and cooling. The compensator bimetal then responds to the temperature change to modify the harsh initial response. The slower response can be accomplished by shielding the compensator from the air stream of passenger compartment air and/or attaching it to a large thermal mass such as the regulator frame. This tends to increase heat transfer from the compensator bimetal.

Therefore, an object of the invention is to provide a low-cost vacuum regulator for use in an automotive temperature control system utilizing dual bimetal elements which respond oppositely to one another and at different time rates to air temperature changes in the passenger compartment to provide initial quick response without undesirable oscillation of the regulator controlled air temperature.

A further object of the invention is to provide a low cost vacuum regulator for use in an automotive temperature control system utilizing dual bimetal elements for positioning a valve in an air bleed port and which are adjusted to a predetermined setting by a cam adjustor means to space the bimetal elements and valve with respect to the air bleed port.

Further objects and advantages of the present invention will be apparent from the following detailed description reference being had to the accompanying drawings in which preferred embodiments are clearly shown. In The Drawings:

FIG. 1 is a schematic view of the automotive temperature control system including the subject vacuum regulator;

FIG. 2 is a partially sectioned elevational view of the vacuum regulator;

FIG. 3 is a sectioned view of one embodiment of the vacuum regulator taken along section line 3—3 in FIG. 2 and looking in the direction of the arrows;

FIG. 3a is a fragmentary view of the valve element shown in FIG. 3;

Figure 4:
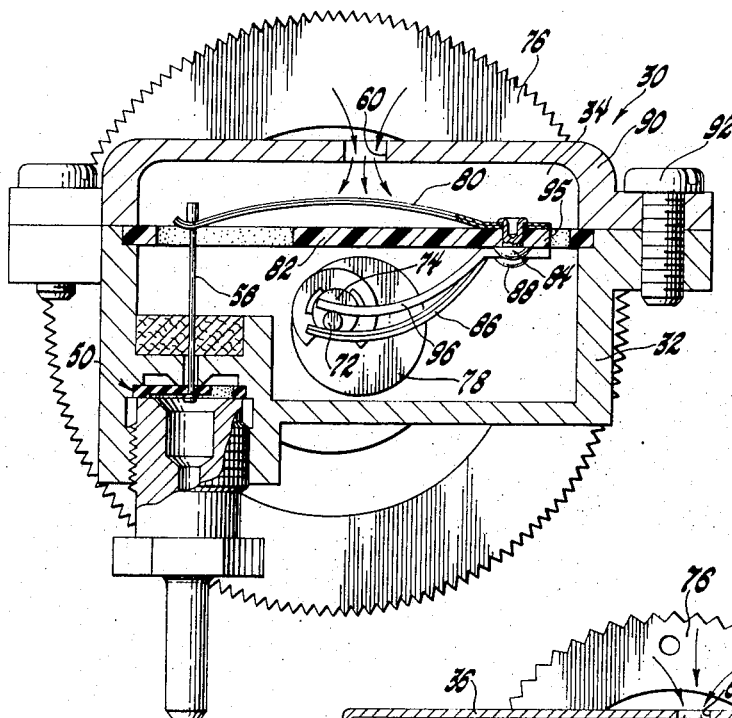
FIG. 4 is a sectioned view similar to FIG. 3 of another embodiment of the vacuum regulator.

In FIG. 1 of the drawings, the subject automotive temperature control system is schematically illustrated. Air is blown into a passenger compartment 10 by a discharge duct 12 through outlets 14. Air enters the system through an inlet 16 and is directed by a blower 18 to the inlet side of a heater core 20. Heater core 20 is warmed by engine coolant supplied through tubes 21. A bypass 22 conveys part of the air around the heater core 20 and an air mix damper or temperature door 24 controls the relative proportion of air flowing through heater core 20 and bypass passageway 22 to produce a desired outlet temperature of air entering passenger compartment 10.

The air mix damper 24 is pivotally positioned by a multiposition vacuum motor 26. Vacuum motor 26 is powered by vacuum pressure supplied from a vacuum source 28 such as the intake manifold of an internal combustion engine. A vacuum regulator 30 in the passenger compartment 10 bleeds air at atmospheric pressure into a vacuum line 31 to vary the strength of vacuum pressure in response to air temperature within passenger compartment 10. An orifice 33 is interposed in vacuum line 31 between the source 28 and motor 26.

One embodiment of the vacuum regulator 30 shown in FIGS. 2, 3 includes a frame 32 having a hollow interior 34. A cover 36 is attached to the frame 32 by bent over tabs 38. A vacuum fitting 40 which is adapted to be connected to vacuum line 31 communicated with the interior 34 of the regulator through an air bleed port 42. Fitting 40 is supported by frame 32 within a cylindrical recess 44. A retaining ring 46 holds the fitting to frame 32. An O-ring 48 prevents leakage of the air between the fitting 40 and the inner walls of recess 44.

The air bleed port 42 is closed by a resilient flap valve 50 which is shown in more detail in FIG. 3a. Valve 50 includes an annular portion 52 and a central tongue portion 54 which overlaps the port 42. Air at atmospheric pressure within the regulator interior 34 pushes downward upon the resilient tongue portion 54 of valve 50 to open the air bleed passage 52. A valve pin 56 contacts the tongue portion 50 to hold it against the mouth of port 42. Valve pin 56 is movable within interior 34 by the air temperature responsive means 58. Air enters the interior 34 of the regulator 30 through a port 60 in cover 36. When the air bleed port 42 is opened, the air is drawn through a filter 62 into the vacuum fitting 40 and vacuum line 31 to decrease vacuum pressure therein.

The temperature responsive means 58 includes a first or main bimetal element 62 and a second or compensator bimetal element 64. In FIG. 3, the compensator bimetal 64 is cantilever mounted at its one end to a cantilevered hinge 66 attached to frame 32. The main bimetal 62 is connected to the free and of the compensator bimetal 64 by a pin 68 which permits relative angular movement between the bimetal elements. The other end of the bimetal element 62 contacts the top surface of the compensator bimetal at a pad 70 which permits the end of bimetal 62 to slide on the compensator bimetal element 64.

The low and high expanding sides of the bimetal elements 62 and 64 are arranged to cause opposite movement of the elements in response to changes in air temperature within the regulator interior 34 and the passenger compartment 10. In the embodiment shown in FIG. 3, the low expansion side of element 62 is toward the valve 50 to cause the center of element 62 to move upward with increasing temperature. The low side of element 64 is also toward the valve 50 to cause downward movement of its free end. The opposite effect could be achieved by reversing the elements 62 and 64.

The free end of cantilevered hinge 66 resiliently bears against an adjusting pin 72 offset from the center of rotation of a shaft 74. The shaft 74 is manually rotated by a thumbwheel adjustor 76 which projects into the passenger compartment 10, which pivots pin 72 and moves the hinge 66 upward or downward. This moves the bimetal elements 62 and 64 and valve pin 56 upward or downward.

For the initial calibration of the thumbwheel adjustor, shaft 74 is supported for rotation within a bushing 78. The shaft 74 is offset from the center of bushing 78 so that when the bushing is rotated, the shaft 74 and pin 72 are moved relative to hinge 66.

In operation of the regulator, air enters its interior 34 through the port 60 from the passenger compartment 10. The air strikes the bimetal elements 62 and 64 which are positioned by the thumbwheel adjuster 76 relative to valve 50. A difference in air temperature from the preset temperature of the thumbwheel adjuster causes the first bimetal element 62 to rapidly move pin 56 and connected valve 50 to either close or open the air bleed port 42 to effect maximum heating or cooling.

The air temperature change effects the compensator bimetal element 64 somewhat more slowly than bimetal 62 because of its greater mass and because it is attached at one end to the hinge 66 which tends to increase its ability to transfer heat from itself. As the temperature of passenger compartment 10 approaches the preset temperature of the thumbwheel adjuster 76, the compensator bimetal 64 responds in the opposite direction than bimetal 62 to decrease the initial maximum response of bimetal 62 and to therefore prevent the temperature within the passenger compartment from exceeding the preset temperature or overshooting the desired temperature. Overshooting the preset temperature which would occur without dual interconnected bimetals, would cause the setting or air door 24 to oscillate about the correct location for the preset temperature point.

Figure 8:
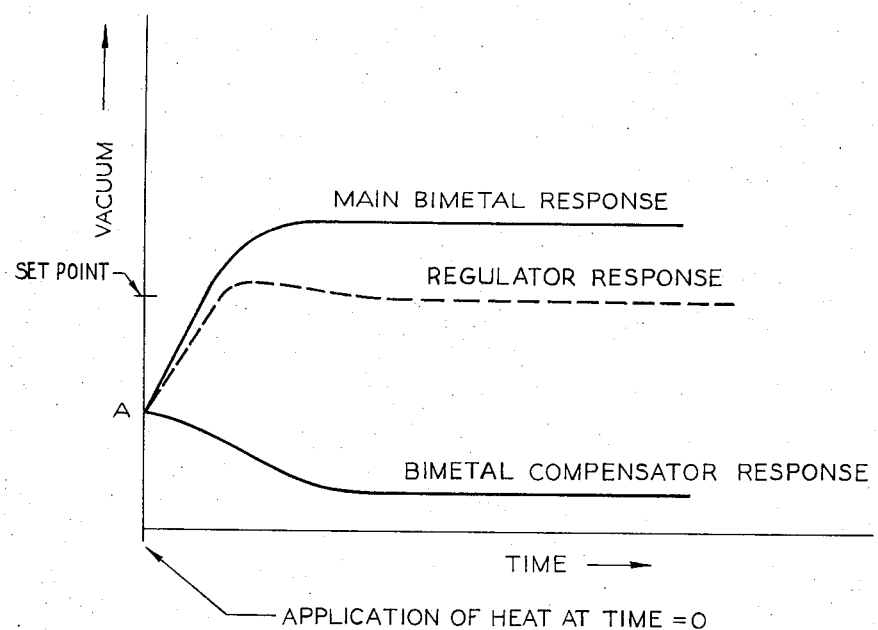
FIG. 8 is a plot of the resultant vacuum pressure in relation to time showing the individual responses of the two bimetal elements and the combined response of the vacuum regulator.

The response characteristics of the bimetal elements 62 and 64 singularly and in combination are best shown by FIG. 8 which shows a plot of vacuum pressure line 31 on the vertical axis and time on the horizontal axis. The set point on the vertical axis corresponds to a given setting of the thumbwheel adjustment 76 which is different from the ambient temperature which would correspond to a setting A. The main bimetal responds quickly which changes the position of the air mix door 24 to modify the temperature passed into the passenger compartment 10. In this rapid initial response the main bimetal overshoots the response needed for the set temperature under steady state conditions. To prevent the regulator from overshooting, the bimetal compensator 64 responds in an opposite direction to counteract the overshoot characteristics of the main bimetal 62. As shown in FIG. 8, the compensator bimetal responds more slowly to temperature changes due to its larger thermal mass and its connection to a large mass as previously explained. The broken line in FIG. 8 represents the combined response of the regulator caused by the combination of the main bimetal 62 and the compensator bimetal 64. Note that little overshoot is encountered.

Figure 4A:
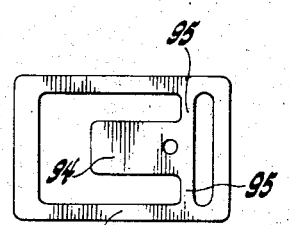
FIG. 4a is a fragmentary view of the hinge element shown in FIG. 4.
Figure 5:
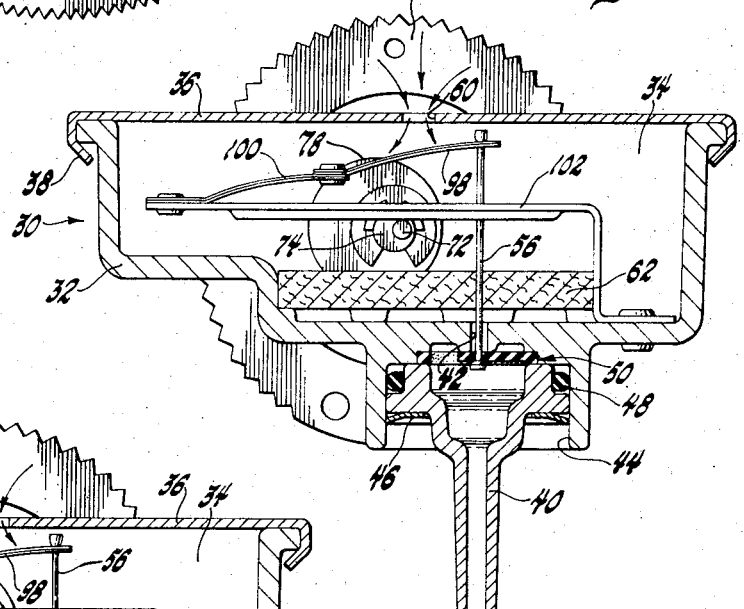
FIG. 5 is a sectioned view similar to FIG. 3 of another embodiment of the vacuum regulator.

The embodiment of the regulator as set forth in FIGS. 4 and 5 are similar to that set forth in FIG. 3 but for the method of mounting and interconnecting the bimetal elements within the regulator 30. The main bimetal element 80 in FIG. 4 is connected to a flexible gasket 82 by a rivet 84. Likewise, a compensator bimetal element 86 is attached to the gasket 82 by a rivet 88. The gasket 82 is held at its peripheral edge between frame 32 and the cover 90. The cover 90 is secured to the frame 32 by a plurality of screws 92. The gasket 82 is shown is FIG. 4a and includes a midportion shield 94 which is free to pivot about hinge portions 95. The elements are thermally insulated from one another by their attachment to the gasket 82 and the midportion 94 shields the compensator bimetal 86 from the flow of incoming air through opening 60 to produce a desirable time lag between elements 80 and 86. For adjusting the relatively positions between the elements 80, 86 and the valve 50, an eccentric pin 72 engages the compensator bimetal 86. An arm 96 engages one side of pin 72 and the bimetal 86 engages the other side of pin 72. Rotation of shaft 74 causes pin 72 to adjust the elements 80 and 86 and gasket 82 relative to valve 50.

The low expanding side of element 80 in FIG. 4 is away from valve 50 to cause the element to move away from the valve with increasing temperature. The low expanding side of element 86 is also away from valve 50 to cause counterclockwise rotation of gasket 82 and attached elements 80, 86 with increasing temperature.

The reaction of the compensator element 86 is thermally delayed by its relatively large mass, its contact with shaft 72 and the shield portion 94 which reduces air flow directly on the element 96.

Figure 6:
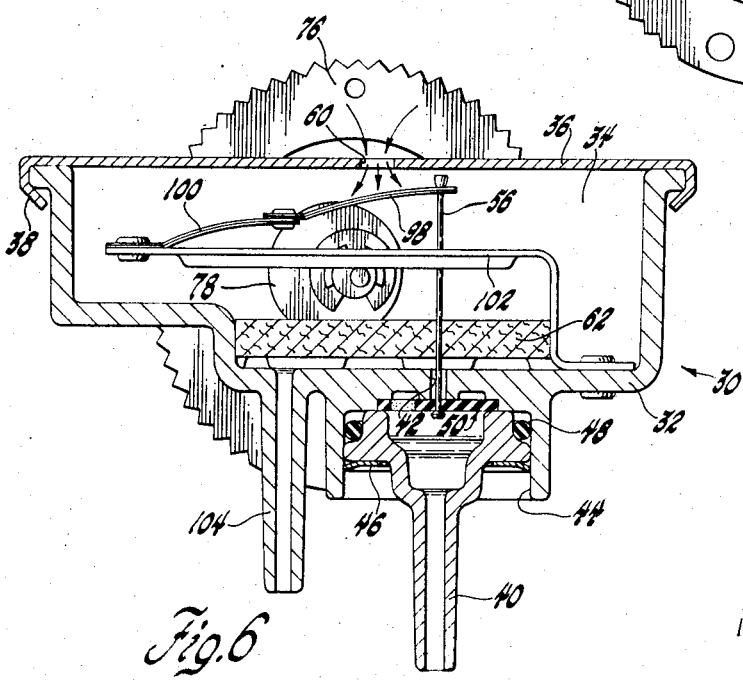
FIG. 6 is a sectioned view similar to FIG. 3 of a still further embodiment of the vacuum regulator.

The regulator 30 shown in FIG. 5 includes a main bimetal element 98 and a compensator bimetal element 100. The compensator bimetal 100 is cantilever mounted at one of its ends to the free end of a metal hinge 102 whose other end is connected to frame 32. The first bimetal 98 is cantilever mounted on the other free end of the compensator bimetal 100. Valve pin 56 is operably connected to the free end of bimetal 98. Eccentric pin 72 on shaft 74 positions the hinge 102 to vary the relative distance between elements 98, 100 and the valve 50. The regulator shown in FIG. 6 is similar to the one shown in FIG. 5 but includes an additional vacuum port 104 into the interior 34. The size of orifice 33 (see FIG. 1) in the vacuum line 31 limits the flow of air through opening 60 into regulator interior 34. This flow through interior 34 is greatly increased by the addition of vacuum port 104 which is connected to vacuum source 28. The increased air sampling by the bimetals accelerates the response of the regulator 30 to changes of passenger compartment air temperature. An orifice may be provided in vacuum port 104 to limit the drain on the vacuum source if desirable.

The low expanding side of element 98 in FIGS. 5 and 6 is away from valve 50 to cause the free end of element 98 to move away from the valve with increasing temperature. The low expanding side of element 100 is toward the valve 50 to cause movement of the elements toward the valve with increasing temperature.

The reaction of the compensator element 100 is thermally delayed by its connection to element 98 at one end and its connection to the relatively large metal hinge 102 at the other end.

Figure 7:
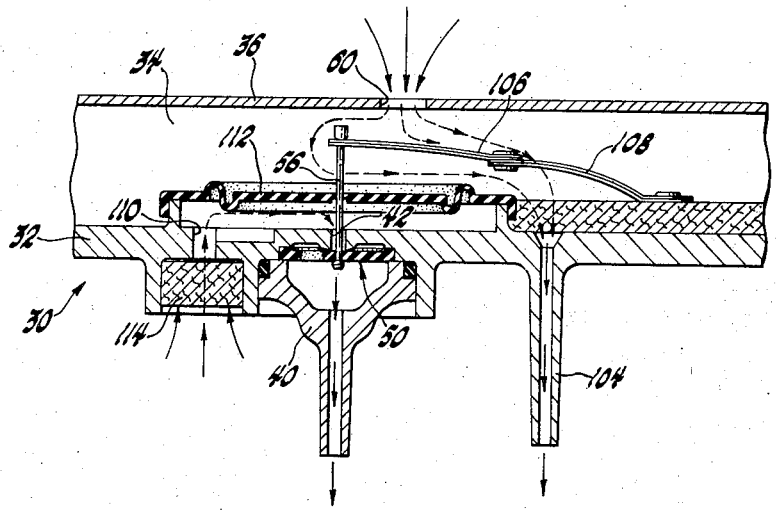
FIG. 7 is a sectioned view similar to FIG. 3 of yet another embodiment of the vacuum regulator.

The regulator shown in FIG. 7 includes a first bimetal 106 and a compensator bimetal 108 arranged as in FIG. 5. Also the second vacuum port 104 added by FIG. 6 is provided. An additional vacuum port 110 in the frame 32 is provided solely to supply bleed air for port 42 and vacuum line 31. A flexible cover member 112 seals the ports 42 and 110 from the interior 34 of regulator 30. The valve pin 56 projects through the cover 112 in sealing relation to operate valve 50. A filter 114 in port 110 prevents foreign matter from entering the vacuum line. By separating the flow of sampled air through the interior 34 from the flow of bled air into the vacuum line through bleed port 42, a more effective filter may be used for ports 42 and 110 without decreasing the air sample.

While the embodiments of the invention as herein described constitute preferred forms, other forms may be adapted.

What is claimed is:

1. An air temperature control system for an automobile having a passenger compartment comprising: a heater; means for conveying air through said heater and into said passenger compartment; a bypass around said heater; a movable air damper for proportioning the amount of air passing through said heater and through said bypass to produce a predetermined air temperature downstream from said heater affected by mixing warm air from said heater with cooler air from said bypass; a vacuum motor operably connected to said air damper for moving it in response to the strength of vacuum pressure therein which movement varies the portions of air passing through said heater and bypass to change the temperature of air downstream from said heater; a vacuum line connected to a source of raw vacuum pressure and said vacuum motor; regulator means for varying the strength of vacuum pressure in said vacuum line by bleeding a quantity of air into said vacuum line in response to the air temperature in said passenger compartment; said vacuum regulator means including an air bleed port between said passenger compartment and said vacuum line and a valve which controls the quantity of air admitted into said vacuum line; a first bimetal element operatively connected to said valve for opening and closing said valve in response to air temperature changes in said passenger compartment; a second bimetal element supporting said first bimetal element and responsive to air temperature changes in said passenger compartment to oppose the opening and closing movement of said first bimetal element; said second bimetal element being connected to a flexible hinge member in good heat transfer relation thereto for transferring heat between said second bimetal element and said hinge member upon air temperature changes and therefore to cause said second bimetal element to respond less rapidly than said first bimetal element to air temperature changes; means connecting said first bimetal element and said valve for operating said valve in response to the combined movement of said bimetal elements; adjustment means including a manually rotatable eccentric pin operably connected to said hinge member for moving said bimetal elements relative to said valve which movement selectively varies the vacuum pressure in said vacuum line and changes the position of said air damper to affect a change in the air temperature in said passenger compartment whereby the heat transferred from said second bimetal element to said hinge member modifies the combined response of said bimetal elements to air temperature changes for positioning said air damper initially by movement of said first bimetal element and subsequently by the time delayed movement of said second bimetal element.

2. An air temperature control system for an automobile having a passenger compartment comprising: a heater; means for conveying air through said heater and into said passenger compartment; a bypass around said heater; a movable air damper for proportioning the amount of air passing through said heater and through said bypass to produce a predetermined air temperature downstream from said heater affected by mixing warm air from said heater with cooler air from said bypass; a vacuum motor operably connected to said air damper for moving it in response to the strength of vacuum pressure therein which movement varies the proportion of air passing through said heater and bypass to change the temperature of air downstream from said heater; a vacuum line connected to a source of raw vacuum pressure and said vacuum motor; regulator means for varying the strength of vacuum pressure in said vacuum line by bleeding a quantity of air into said vacuum line in response to the air temperature in said passenger compartment; said vacuum regulator including an air bleed port between atmosphere and said vacuum line and a valve which controls the quantity of air admitted into said vacuum line; a first bimetal element operably connected to said valve for opening and closing said valve in response to air temperature changes in said passenger compartment; a second bimetal element supporting said first bimetal element and responsive to air temperature changes in said passenger compartment to oppose the opening and closing movement of said first bimetal element; a flexible hinge member supporting said second bimetal element; means connecting said first bimetal element and said valve for operating said valve in response to the combined movement of said bimetal elements; adjustment means including a manually rotatable eccentric pin contacting said hinge member for moving said bimetal elements relative to said valve which movement selectively varies the vacuum pressure in said vacuum line and thus changes the position of said air damper for affecting a change in said predetermined air temperature in said passenger compartment; said hinge member being connected in good heat transfer relation to said second bimetal element for transferring heat therefrom upon air temperature changes thereby delaying the response of said second bimetal element to air temperature changes; said hinge member shielding said second bimetal element from the flow of air through said vacuum regulator therefore further delaying the response of said second bimetal element to air temperature changes whereby said air damper is initially positioned upon a change in air temperature by movement of said first bimetal element and subsequently by the time delayed movement of said second bimetal element; vacuum port means in said regulator adapted to be connected to a source of raw vacuum pressure for continually drawing air from said passenger compartment through said regulator and over said bimetal elements.

* * * * *